(No Model.) 2 Sheets—Sheet 1.
R. E. LINHAM.
SULKY PLOW.
No. 311,016. Patented Jan. 20, 1885.
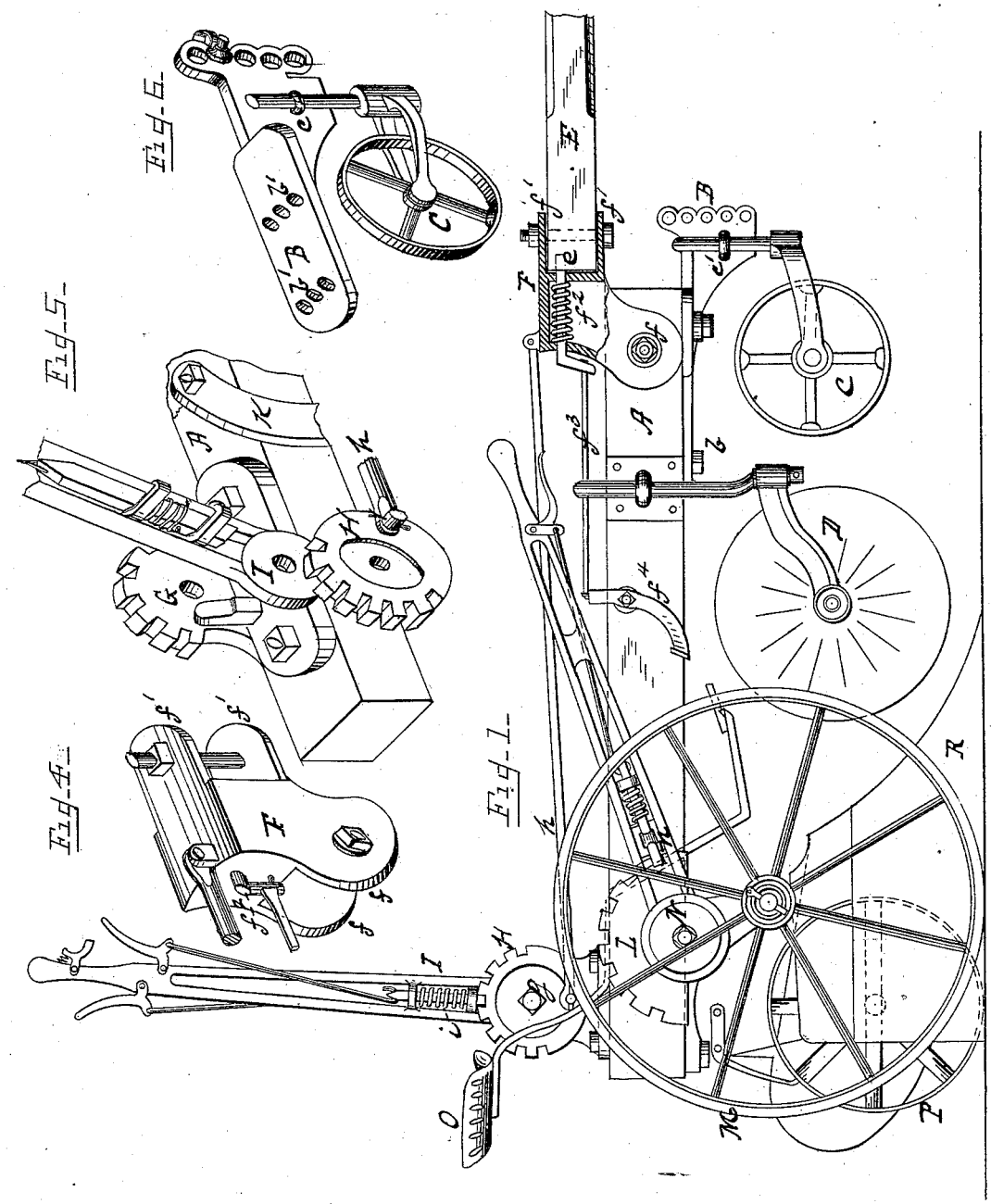
WITNESSES
INVENTOR
Robert E. Linham
by F. W. Ritter
Attorney
N. PETERS, Photo-Lithographer, Washington, D. C.

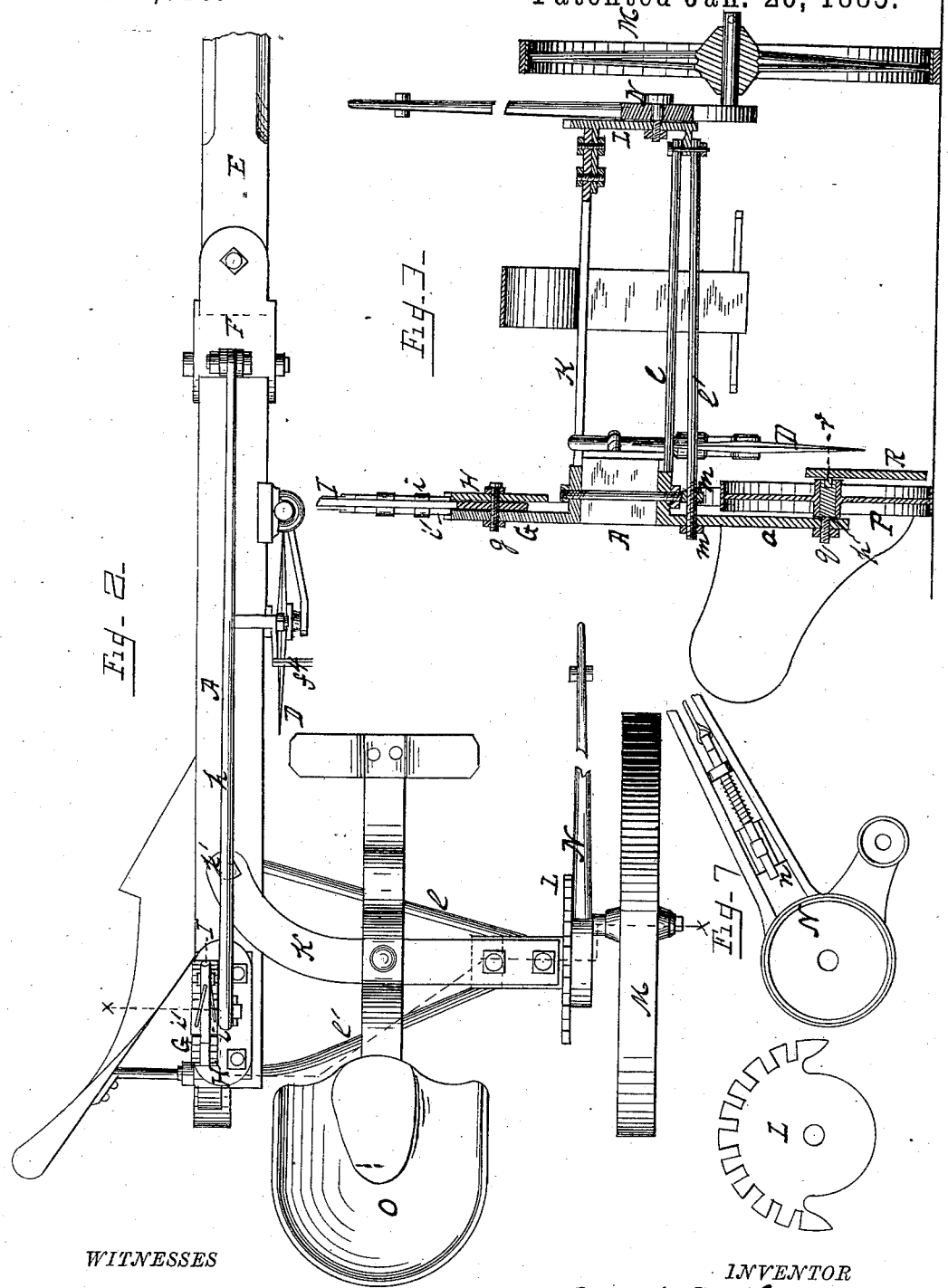

UNITED STATES PATENT OFFICE.

ROBERT E. LINHAM, OF MANSFIELD, OHIO, ASSIGNOR OF TWO-THIRDS TO BYRAM B. McVAY AND JAMES ALLISON, OF SAME PLACE.

SULKY-PLOW.

SPECIFICATION forming part of Letters Patent No. 311,016, dated January 20, 1885.

Application filed September 26, 1884. (No model.)

*To all whom it may concern:*

Be it known that I, ROBERT E. LINHAM, a citizen of the United States, residing as Mansfield, in the county of Richland and State of Ohio, have invented certain new and useful Improvements in Sulky-Plows; and I hereby declare the following to be a full, clear, and exact description of the same, reference being had to the accompanying drawings, in which—

Figure 1 is a side elevation from the land side. Fig. 2 is a plan view. Fig. 3 is a transverse section on line $x\,x$, Fig. 2. Fig. 4 is an enlarged perspective view of the tongue-joint. Fig. 5 is an enlarged detached perspective of the mechanism for elevating and depressing the plow-point. Fig. 6 is a detail perspective of clevis-bracket and caster combined. Fig. 7 is an enlarged detail of the land-wheel mechanism.

My invention relates to that class of plows termed "sulky-plows," wherein the operator is mounted, and wherein mechanism is provided for adjusting and controlling the plow.

The main objects to be accomplished in this class of plows are, first, to obtain such control of the plow that its point can be readily elevated or depressed at will by the operator without dismounting; secondly, to obtain such control of the frame that the same can in like manner be raised and lowered at will; thirdly, to adjust the land-wheel to the plow so that it shall remain parallel therewith at all times, whether the plow be given more or less land.

The principal features of my invention are embodied in the mechanism or combination of devices for the purposes specified, while the minor features embrace the construction of special elements of the several combinations, whereby the several combinations are simplified and rendered more effective.

Of the minor features or details, several are of value in other constructions of plows, as will readily appear to any one familiar with this class of devices.

In order that the scope of the invention may be more readily understood, I will describe the general construction and then add a detailed description of the preferred form and arrangement of the devices. First, in order to elevate and depress the plow-point, I provide a fixed segmental rack, a revolving rack-disk, and a lever having two spring dogs or bolts, or their equivalents, and connect the revolving rack-disk by a suitable connecting-rod or link with the tongue-joint, which construction enables me to greatly increase the range of motion of the plow-point and facilitates the adjustment of the same at any desired point; second, I provide a tongue-joint having vertical beam-flanges, horizontal tongue-flanges, and a spring locking-bolt, so as to facilitate the control of both the tongue and the plow-beams; third, I combine the caster or guide wheel with a bracket (or clevis) pivoted on the plow-beam so as to permit a lateral adjustment thereof, which enables the caster to automatically center or adjust itself to the line of draft when three horses are harnessed abreast; fourth, I journal the land-wheel (form the axle) on one, or the short arm, of a bell-crank lever which is pivoted at its angle on a segmental rack secured to a bracket projecting at right angles from the plow-beam, the long arm of the lever being provided with a spring bolt or dog which engages with the segmental rack, by which means the frame may be raised or lowered to accommodate the level of the plow; fifth, one brace-rod of the cross-bracket (or segment-rack) which carries the land-wheel is permitted to slide through the plow-standard, its end-play being limited by an adjustable nut or like device, by which means the outer end of the cross-bracket and segment-rack (or the land-wheel axle) are allowed sufficient movement to permit the land-wheel to adjust itself and remain parallel to the plow; sixth, the stud or axle of the furrow-wheel is formed with a thread and shoulder at one end, by means of which it is secured to the standard, and is notched or slightly bored at the opposite end to receive a lug on the inner face of the landside, by which means I avoid the boring through of the stud or axle of the furrow-wheel and the boring of the landside, with the attendant disadvantages of weakening the parts, &c.

I will now proceed to describe my invention specifically, so that others skilled in the art to which it appertains may apply the same.

In the drawings, A indicates the plow-beam, having a suitable standard, a, to which the plow is secured. To the forward end of the beam is pivoted by a bolt, b, the clevis-bracket B. This clevis-bracket B (see Fig. 6) has a transverse series of bolt-holes, b', (or in lieu thereof a slot,) and a bolt, by means of which it can be adjusted laterally to suit the draft of two or three horses abreast, as the case may be.

In order that the caster C may likewise adjust itself laterally to the line of draft, I secure it to the bracket B by the eye c, having a threaded shank and clamp-nut, or in other suitable manner, so that the caster may move with the clevis-bracket and independently of the plow-beam. In rear of the caster C the rolling colter D, when used, may be adjustably secured to the plow-beam by a similar eye with threaded shank, or in other suitable manner.

E indicates the tongue, which is pivoted to the end of the plow-beam by means of a tongue-joint, F, so as to be capable of oscillation both vertically and horizontally. The tongue-joint F, (see Fig. 4,) which may be a single casting, if desired, has two downwardly-projecting flanges, $f$, which embrace the sides of the plow-beam A at its end, and to which it is pivoted, and two horizontal flanges, $f'$, by which it is pivoted vertically to the tongue E, so as to permit of the lateral vibration of the tongue. It is also bored longitudinally, and provided with a spring-bolt, $f^2$, which is connected by a rod, $f^3$, with a foot-lever, $f^4$, within easy reach of the driver. In the end of the tongue E is a bolt-hole, e, for the reception of bolt $f^2$. When the bolt is shot, the tongue is held rigid against lateral vibration, and when withdrawn the team can be swung around to facilitate turning corners without backing.

On the rear end of beam A, near the driver's seat, is secured a standard provided at its upper end with a fixed segmental rack, G, and projecting therefrom (centered with the fixed segmental rack) is a short bolt, G, on which is loosely journaled a revolving disk-rack, H, having a wrist-pin for the end of a rod, h, by means of which the loose rack-disk is connected with the tongue-joint F.

Pivoted on the bolt g, between the fixed segmental rack G and the rotary disk-rack H, is a lever, I, having two spring bolts or dogs, i i', the one to engage with the rotary disk-rack H, and the other to engage with the fixed rack. When the point of the plow is to be elevated or depressed, the lever I is moved to cause the spring bolt or dog i to engage with the desired notch of the rotating disk-rack H, and the disk rotated until the forward end of the plow-beam has been lowered or raised the desired distance, when the spring-dog i' is allowed to engage with the proper notch in the fixed rack G. By using the rotating disk-rack and the independent lever it is evident that a greater range of movement is obtained than can otherwise be had.

Projecting at right angles from the plow-beam A is a bracket, K, secured to the plow-beam by a pivot-bolt, k', and bolted to the outer end of said bracket K is a segmental rack-plate, (or casting,) L, which has a flange above for bolting it to the bracket K, and a flange below for the attachment of brace-rods l l'. The forward brace-rod, l, is secured by one bolt to the standard a, and by another to the lower flange of the segmental rack-plate L, while the rear brace-rod, l', is bolted pivotally to the lower flange of the segmental rack L, and at the other end projects through a hole in standard a. Where it projects through standard a it is threaded and provided with adjustable nuts m. It will thus be seen that while the segmental plate L and outer end of bracket K have some play, yet the nuts m on brace-rod l' will limit the same and brace the bracket sufficiently.

M indicates the land-wheel, the axle of which is secured to one end (the short arm) of an elbow-lever, N, which lever is pivoted at its angle on the segmental rack-plate L, secured to the outer end of bracket K. The long arm of elbow-lever N is provided with a spring bolt or dog, n, which engages with the notches of the segmental rack-plate L. This elbow-lever N is alike on both sides, and the spring-dog n is located in a center slot of the long arm, so that by simply changing the land-wheel axle from one side to the other of the short arm the lever N can be used for either a right or left hand plow. By raising or lowering the long arm of elbow-lever N the axle of the land-wheel, which is secured to the short arm thereof, is correspondingly raised or lowered, so as to accommodate the land-wheel (or frame) to the level of the plow, and as the end of the bracket K and the segmental rack-plate L have some play, (owing to brace-rod l' and nuts m, as before set forth,) the land-wheel can adjust itself and remain parallel to the plow.

O indicates the driver's seat, which is secured to bracket K within easy reach of all the levers by means of which the mechanism is operated.

P indicates the furrow-wheel, located between the landside and the standard so as to facilitate short turns. The stud or axle on which the furrow-wheel rotates is constructed with one end reduced, as at p, to form a shoulder to brace against the standard, and is threaded and provided with a nut, q, so that it can be firmly bolted to the standard a. The opposite end of the stud is bored or slotted, and receives a pin or projection, r, on the inner face of the landside R. By this construction the stud or axle of the furrow-wheel is securely held without the necessity of boring a hole in the landside or through the stud or journal.

Having thus described the nature, operation, and advantages of my invention, what I claim, and desire to secure by Letters Patent, is—

1. In a plow having a tongue-joint, the combination of a fixed rack, a rotary disk-rack connected with the tongue-joint, and an independent lever having dogs to engage with the fixed and rotary disk-rack, substantially as described.

2. In a sulky-plow, the combination of a plow-beam and a tongue connected by a double pivot-joint, which permits vertical and lateral play between the parts, a rack, lever, and pawl for adjusting and controlling the vertical movement of the parts, and a spring-bolt for locking the tongue against lateral vibration, substantially as and for the purposes specified.

3. The tongue-joint for sulky-plows, having vertical beam-flanges, horizontal tongue-flanges, and a spring locking-bolt, substantially as and for the purposes specified.

4. In a sulky-plow, the combination, with the plow-beam and the tongue connected by a joint having a vertical and horizontal pivot motion, of a rack, lever, and pawl, and a spring-bolt for controlling the connections between the plow-beam and tongue, and a horizontally-adjustable clevis-bracket having the wheel-caster attached thereto, substantially as and for the purpose specified.

5. The combination, with a bracket-clevis having a vertical pivot-connection which permits of lateral adjustment of the bracket on the beam, of a caster-wheel secured thereto and movable therewith, substantially as and for the purposes specified.

6. The combination, with the plow and its beam, of a bracket pivoted on the beam, a rack secured to the outer end of the bracket, an elbow-lever having a wheel-spindle and pivoted on the bracket or rack, a lever and pawl for adjusting the elbow-lever, and braces which permit a limited play of the rack and outer end of the bracket, substantially as and for the purposes specified.

7. The elbow-lever for sulky-plows, having uniform sides and a centrally-arranged dog or pawl, whereby the same can be used for the land-wheel of either right or left hand plows, substantially as and for the purposes specified.

8. In a sulky-plow, the combination, with the adjustable land-wheel and its pivoted bracket, of the brace adjustably connected with the plow beam or standard, substantially as and for the purposes specified.

9. The combination, with a plow-standard, a landside having a projection or lug on its inner face, and a furrow-wheel arranged between the same, of a stud or axle reduced and threaded at one end for attachment to the standard, and bored at the opposite end to receive the pin or lug on the landside, substantially as and for the purposes specified.

In testimony whereof I affix my signature, in presence of two witnesses, this 22d day of September, 1884.

ROBERT E. LINHAM.

Witnesses:
GEO. D. ALLISON,
B. W. MORRIS.